US012059917B2

(12) United States Patent
Friese et al.

(10) Patent No.: US 12,059,917 B2
(45) Date of Patent: Aug. 13, 2024

(54) BOOKBINDING MACHINE WITH STOP OF TRANSPORT ELEMENTS AT A PROCESSING STATION WHILE TRANSPORT ELEMENTS ARE DISENGAGED AT OTHER PROCESSING STATIONS

(71) Applicant: Meccanotecnica S.p.A., Gazzaniga (IT)

(72) Inventors: Thomas Friese, Leipzig (DE); Frank Sommerer, Grobposna (DE); Jan Wruck, Albino (IT)

(73) Assignee: Meccanotecnica S.p.A., Gazzaniga (IT)

( * ) Notice: Subject to any disclaimer, the term of this patent is extended or adjusted under 35 U.S.C. 154(b) by 30 days.

(21) Appl. No.: 17/788,877

(22) PCT Filed: Dec. 24, 2020

(86) PCT No.: PCT/EP2020/087863
§ 371 (c)(1),
(2) Date: Jun. 24, 2022

(87) PCT Pub. No.: WO2021/130363
PCT Pub. Date: Jul. 1, 2021

(65) Prior Publication Data
US 2023/0034300 A1 Feb. 2, 2023

(30) Foreign Application Priority Data
Dec. 27, 2019 (IT) ........................ 102019000025639

(51) Int. Cl.
*B42C 19/08* (2006.01)
*B42C 7/00* (2006.01)
*B42C 11/04* (2006.01)

(52) U.S. Cl.
CPC ............. *B42C 19/08* (2013.01); *B42C 7/008* (2013.01); *B42C 11/04* (2013.01)

(58) Field of Classification Search
CPC .......... B42C 19/08; B42C 7/008; B42C 11/04
(Continued)

(56) References Cited

U.S. PATENT DOCUMENTS 4,653,972 A * 3/1987 Lewis ..................... B42C 19/08 412/37
2008/0199276 A1* 8/2008 Graushar ................ B42C 11/00 412/4
2019/0152249 A1* 5/2019 Fukuda ................... B42C 13/00

FOREIGN PATENT DOCUMENTS

EP 0152158 A2 8/1985
EP 3495156 A1 6/2019

OTHER PUBLICATIONS

European Patent Office; "International Search Report and Written Opinion from PCT Application No. PCT/EP2020/087863 mailed on Mar. 30, 2021"; pp. 1 through 9; Published in WO.

* cited by examiner

*Primary Examiner* — Kyle R Grabowski
(74) *Attorney, Agent, or Firm* — FisherBroyles LLP; Bryan A. Santarelli

(57) ABSTRACT

A bookbinding machine (100) is proposed. The bookbinding machine (100) comprises a driving system (225) for driving transport elements (210*a*-210*c*) of book blocks (215*a*-215*c*) in succession across at least one engagement processing station 5 (205*d*) and one or more disengagement processing stations (205*a*,205*e*) which process the book blocks while stationary therein. Control means (120) stop the driving system (225) when each of the transport elements (210*b*) is at the engagement processing station (205*d*) engaged with the driving system (225) and other transport elements (210*a*, 210*c*) are at the disengagement processing stations (205*a*, 205*e*) disengaged from the driving system (225). A bookbinding plant comprising one or more of these bookbinding
(Continued)

machines (100) is also proposed. Moreover, a corresponding method for operating a bookbinding machine (100), a computer program and a computer program product for implementing the method are proposed.

20 Claims, 8 Drawing Sheets

(58) Field of Classification Search
USPC ........................................................... 412/13
See application file for complete search history.

BOOKBINDING MACHINE WITH STOP OF TRANSPORT ELEMENTS AT A PROCESSING STATION WHILE TRANSPORT ELEMENTS ARE DISENGAGED AT OTHER PROCESSING STATIONS

This application claims priority to International Patent Application No. PCT/EP2020/087863 filed on Dec. 24, 2020 which claims priority to Italian Patent Application No. 102019000025639 filed on Dec. 27, 2019, which applications are incorporated by reference herein.

TECHNICAL FIELD

The present invention relates to the bookbinding field. More specifically, this invention relates to the transport of book blocks in bookbinding machines.

BACKGROUND ART

The background of the present invention is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present invention.

Bookbinding machines of different types are commonly used in bookbinding plants to produce books at industrial level. For example, a (bookbinding) perfect-binding machine has several processing stations for performing different operations on book blocks, such as feeding, pressing, milling, applying glue, applying end-papers, applying fastening linings, applying (soft) covers and delivering. For this purpose, a transport system transports the book blocks in succession across the processing stations. Typically, the transport system comprises several transport elements (such as clamps) for transporting the book blocks individually, which clamps are mounted on an endless conveyor driving all of them together. In some processing stations (for example, for feeding the book blocks and applying the covers), the processing of the book blocks requires stopping the clamps therein for corresponding processing times. However, in these bookbinding machines (hereafter referred to as fixed machines), since the conveyor drives all the clamps together, whenever any clamp is stopped in a processing station all the other clamps are stopped as well.

In order to have an optimal working of the processing stations, their processing times should be at least equal to corresponding optimal values, which are generally different among the processing stations. As a consequence, since when the conveyor is stopped all the clamps are in corresponding processing stations (to reduce the downtime of the perfect-binding machine), the conveyor remains so for the longest processing time of all of them (for example, the one required to feed the book blocks). This reduces a yield of the perfect-binding machine.

Alternatively, U.S. Pat. No. 7,918,635 proposes driving the clamps individually along a common guide. This result is achieved by splitting the guide into multiple segments with corresponding linear motors (based on travelling waves/fields), which are controlled individually by a control unit of the bookbinding machine. Moreover, EP-B-2738011 proposes driving the clamps along a common guide with independent drives and motors. This result is achieved by providing superimposed endless chains (one for each clamp) with corresponding motors that are controlled individually by a control unit of the perfect binding machine. In both these bookbinding machines (hereafter referred to as independent machines), the clamps may be moved at will individually. However, the linear motors or the multiple chains (with their motors) are expensive. Moreover, the individual control of the different linear motors or chains add complexity to the perfect-binding machine. This adversely affects a total cost of the perfect-binding machines and then a production cost of the books. Moreover, in the case of the multiple drives they are difficult to synchronize, the chains are coupled with the clamps at different points (requiring constructive efforts to compensate corresponding different lever effects), any supply of media (such as compressed air) is to be arranged at different levels and the manual feeding of the book blocks is critical (because while they are loaded into the clamp of a stationary drive the other drives are generally moving).

EP-A-0152208 instead proposes using a single chain that always moves at a constant speed; each clamp has a channel for receiving a corresponding stud integral with the chain. At some processing stations the chain perform an excursion so that each stud disengages from the corresponding clamp, which then remains stationary for the time required to perform the corresponding operations (such as for feeding the book blocks and for applying the covers). At the same time, the other clamps remain engaged with the corresponding studs so as to continue moving; particularly, the other clamps move across the remaining processing stations (such as for milling and applying glue) and the clamps following the stopped ones advance towards the corresponding processing stations. This bookbinding machine (hereafter referred to as disengagement machine) reduces the corresponding downtimes with an increase of the yield of the perfect-binding machine. However, now the clamps may only stop in some processing stations (at the positions defined by the corresponding excursions) or move at the same speed of the chain otherwise.

SUMMARY

A simplified summary of the present invention is herein presented in order to provide a basic understanding thereof; however, the sole purpose of this summary is to introduce some concepts of the invention in a simplified form as a prelude to its following more detailed description, and it is not to be interpreted as an identification of its key elements nor as a delineation of its scope.

In general terms, the present invention is based on the idea of stopping each transport element at a processing station (or more) while corresponding transport elements are disengaged at other processing stations.

Particularly, an aspect provides a bookbinding machine. The bookbinding machine comprises a driving system for driving transport elements of book blocks in succession across at least one engagement processing station and one or more disengagement processing stations, which process the book blocks while stationary therein. Control means stop the driving system when each of the transport elements is at the engagement processing station engaged with the driving system and other transport elements are at the disengagement processing stations disengaged from the driving system.

A further aspect provides a bookbinding plant comprising one or more of these bookbinding machines.

A further aspect provides a corresponding method for operating this bookbinding machine.

A further aspect provides a computer program for implementing the method.

A further aspect provides a corresponding computer program product.

More specifically, one or more aspects of the present invention are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present invention, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, such as value, content and representation). Particularly.

DETAILED DESCRIPTION

Figure 1:
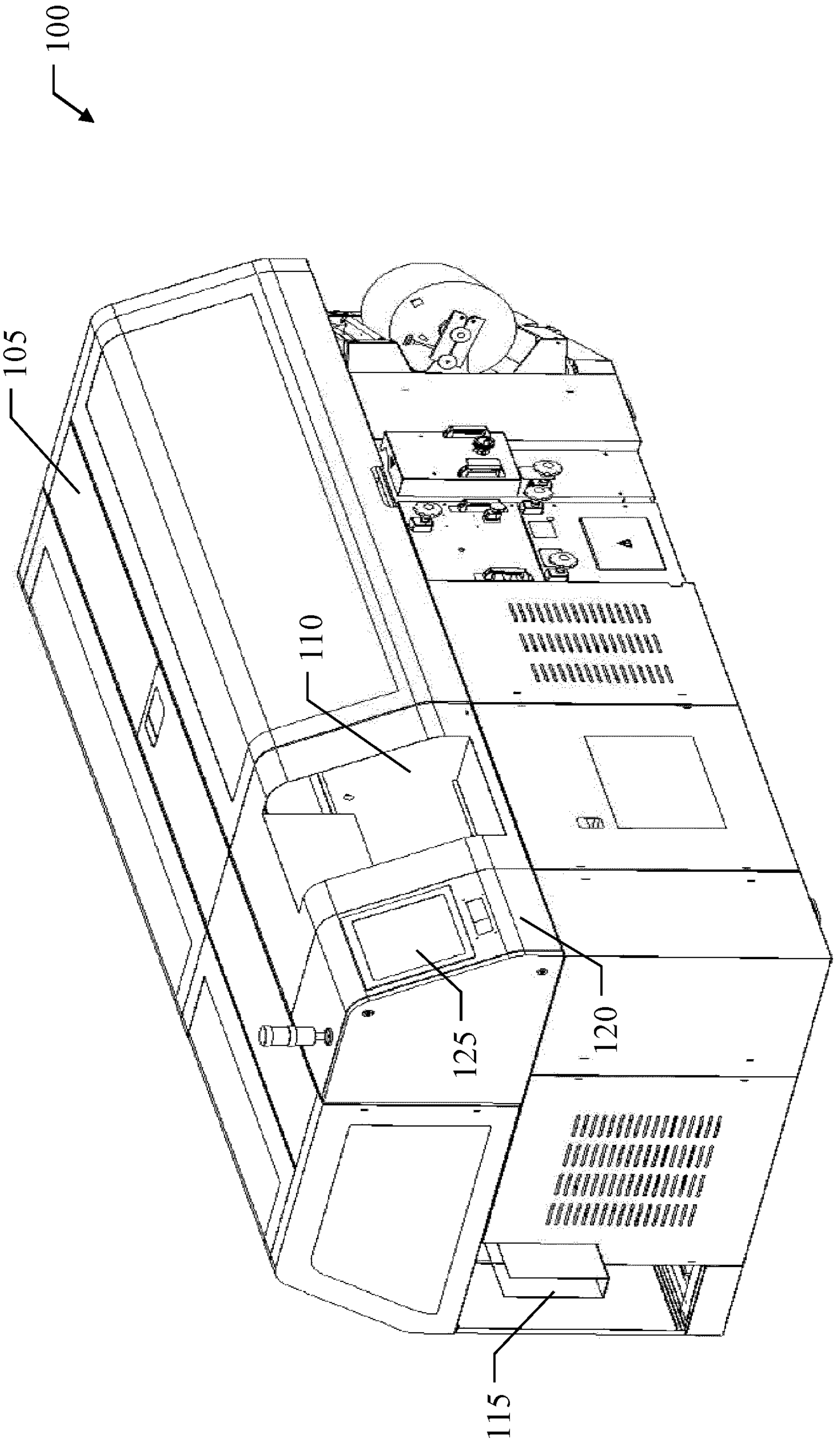
FIG. 1 shows a pictorial representation of a bookbinding machine wherein the solution according to an embodiment of the present invention may be applied.

With reference in particular to FIG. 1, a pictorial representation is shown of a bookbinding machine 100 wherein the solution according to an embodiment of the present invention may be applied.

Particularly, this is a (bookbinding) perfect-binding machine 100; the perfect-binding machine 100 is used to produce books in bookbinding plants, and particularly to apply a fastening lining and/or a (soft) cover to corresponding book blocks, not shown in the figure (each formed by a block of signatures or sheets that are sewn or glued together).

The perfect-binding machine 100 comprises the following components. A casing 105 protects internal parts of the perfect-binding machine 100. The casing 105 has an inlet 110 for feeding the book blocks to be processed to the perfect-biding machine 100, either automatically (from previous bookbinding machines providing the book blocks, such as sewing machines, not shown in the figure) or manually (by an operator of the perfect-binding machine 100); moreover, the casing 105 has an outlet 115 for delivering the book blocks that have been processed in the perfect-binding machine 100 (for following bookbinding machines that complete the production of the corresponding books, such as case-in machines or a three-knives trimming machines, not shown in the figure). A plurality of processing stations (not visible in the figure) are arranged inside the casing 105 for processing the book blocks. Particularly, the processing stations are used to feed the book blocks, to deliver the book blocks and to finish the book blocks, such as by pressing, milling, applying glue, applying end-papers, applying fastening linings, applying covers and so on. A control unit 120 (for example, an industrial PC) controls operation of the perfect-binding machine 100. Particularly, the control unit 120 has (not visible in the figure) a microprocessor or more (providing processing and orchestration functionalities of the control unit 120), a non-volatile memory (such as a ROM storing basic code for a bootstrap of the control unit 120), a volatile memory (such as a RAM used as a working memory by the microprocessor), a mass-memory (such as an SSD for storing programs and data) and controllers for peripherals units (such as an input unit, an output unit, a drive for reading/writing removable storage units like USB keys and so on). In this specific implementation, the peripheral units comprise a touchscreen 125 for both displaying information and entering commands/data.

Figure 2:
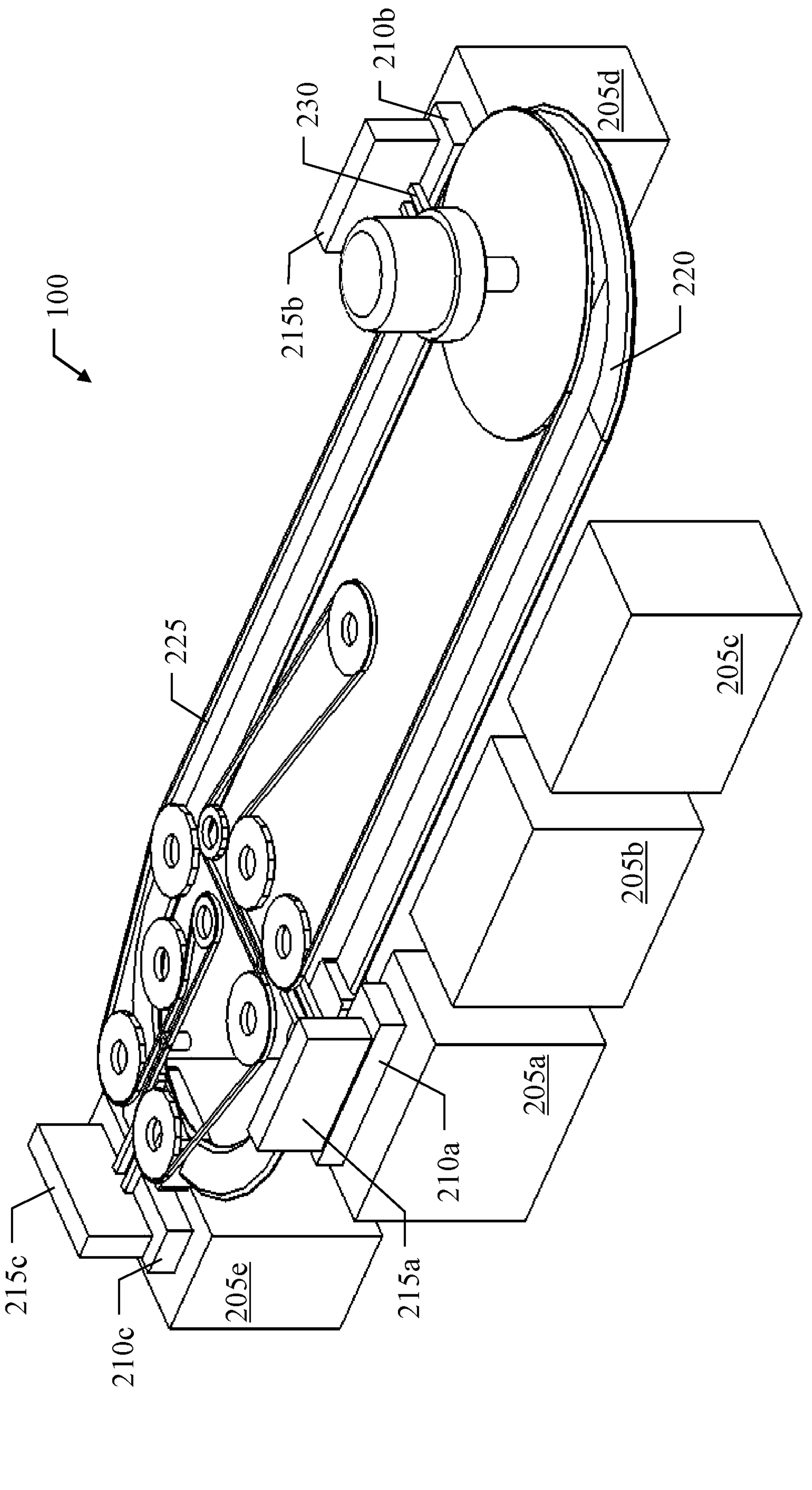
FIG. 2 shows a partially cut-away representation in perspective view of the bookbinding machine according to an embodiment of the present invention.

With reference now to FIG. 2, a partially cut-away representation in perspective view is shown of the bookbinding machine according to an embodiment of the present invention.

Particularly, the figure shows the perfect-binding machine 100 with its processing stations now visible and identified with the references 205*a*, 205*b*, 205*c*, 205*d* and 205*e*. Multiple processing stations (referred to as stationary processing stations), such as the processing stations 205*a*, 205*d* and 205*e*, process the book blocks while they are stationery therein. For example, the processing station 205*a* is a manual feeding station that is used to feed the book blocks to be processed manually, the processing station 205*d* is a cover application station that is used to apply the covers to the book blocks and the processing station 205*e* is a delivering station that is used to deliver the book blocks that have been processed. The other processing stations, if any (referred to as movement processing stations), the processing stations 205*b* and 205*c* in the example at issue, instead process the book blocks while they are moving thereacross. For example, the processing stations 205*b*,205*c* are a milling station (milling the book blocks), a gluing station (applying glue to the book blocks), a lining station (applying fastening linings to the book blocks) and so on.

A transport system transports the book blocks in succession across the processing stations 205*a*-205*e*. Particularly, a plurality of transport elements transport the book blocks individually; in the example at issue, three transport elements 210*a*, 210*b* and 210*c* transporting corresponding book blocks 215*a*, 215*b* and 215*c*, respectively, are shown. For example, these are clamps 210*a*-210*c* clamping the book blocks 215*a*-215*c* arranged vertically. Particularly, each clamp 210*a*-210*c* comprises an internal (bigger) plate and an external (smaller) plate that is movable with respect thereto (opened away from the internal plate to receive/release the book block 215*a*-215*c* and closed towards the internal plate to grasp the book block 215*a*-215*c*). A guide 220 guides the clamps 210*a*-210*c* along a corresponding transport path (denoted with the same reference); the transport path 220 has a closed arrangement (for example, oval one in the figure), which crosses the processing stations 205*e*-205*d*. A (common) driving system 225 drives all the clamps 210*a*-210*c*; the driving system 225 extends along a driving path (denoted with the same reference), which has a closed arrangement as well. As described in detail in the following, the clamps 210*a*-210*c* and the driving system 225 (operatively) engage and disengage selectively. The clamps 210*a*-

210*c* that are engaged by the driving system 225 are all driven together by it; conversely, the clamps 210*a*-210*c* that are disengaged from the driving system 225 remain stationary.

The movement processing stations 205*b*-205*c* are arranged along straight portions of the driving system 225 wherein the clamps 210*a*-210*c* engage with it. In the solution according to an embodiment of the present invention, a stationary processing station (referred to as engagement processing station), or more, is arranged at a portion of the driving system 225 wherein the clamps 210*a*-210*c* engage with it. In the specific example at issue, this is the cover application station 205*d*. The cover application station 205*d* is the most critical one, i.e., the one having the highest impact on a quality of the books being produced. Indeed, a correct application of the corresponding covers to the book blocks 215*a*-215*c* (in terms of either their alignment or solidity) is of the utmost importance for the resulting books. For this purpose, the cover application station 205*d* may also have a sensor 230 (for example, based on an array of LEDs with corresponding photocells) for measuring a displacement of each book block 215*b* therein with respect to the cover (for example, longitudinally). One or more other stationary processing stations (referred to as disengagement processing stations) are instead arranged at corresponding portions of the driving system 225 wherein the clamps 210*a*-210*c* disengage from it. In the specific example at issue, these are the (manual) feeding station 205*a* and the delivering station 205*e*.

Figure 3:
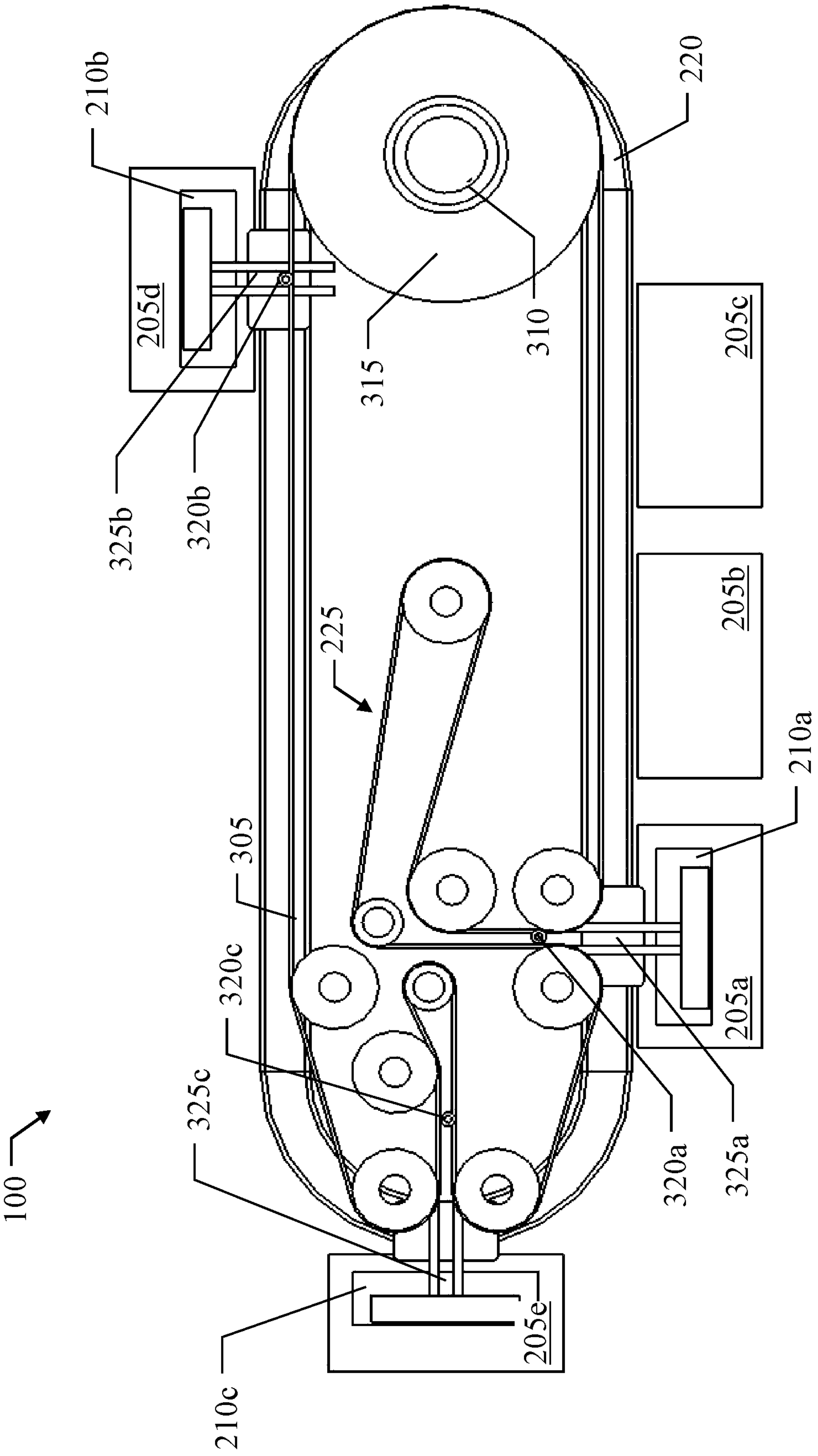
FIG. 3 shows a partially cut-away representation in plant view of the bookbinding machine according to an embodiment of the present invention.

With reference now to FIG. 3, a partially cut-away representation in plant view is shown of the bookbinding machine according to an embodiment of the present invention.

The figure shows the same perfect-binding machine 100 of above. In this specific implementation, the driving path 225 partially differs from the transport path 220. Particularly, the driving path 225 is split into (alternated) one or more active sections corresponding to the transport path 220 (wherein the clamps 210*a*-210*c* engage with the driving system 225) and one or more passive sections away from the transport path 220 (wherein the clamps 210*a*-210*c* disengage from the driving system 225). Particularly, the passive sections are provided at the (disengagement) processing stations 205*a* and 205*e*, and the active sections are provided elsewhere (i.e., at the other processing stations 205*b*, 205*c* and 205*d* and among all the processing stations 205*a*-205*e*).

For example, the driving system 225 comprises an endless conveyor, such as a chain 305 (which is driven along the driving path 225 by a series of cogwheels). A motor 310 (for example, a three-phase electric servomotor) rotates a (driving) cogwheel, denoted with the reference 315, which driving cogwheel 315 in turn moves the chain 305, and then the other (idle) cogwheels as well, at a corresponding driving speed (either constant or variable over time in module). Driving elements 320*a*, 320*b* and 320*c* corresponding to the clamps 210*a*, 210*b* and 210*c*, respectively, are integral with the chain 305, so as to move always together at a same driving speed thereof. For example, these are pegs 320*a*-320*c* projecting from the chain 305 (for example, downwards). Each clamp 210*a*, 210*b* and 210*c* has a slit 325*a*, 325*b* and 325*c*, respectively, for receiving the corresponding peg 320*a*, 320*b* and 320*c*. As described in detail in the following, in the passive sections the pegs 320*a*-320*c* do not act on the corresponding clamps 210*a*-210*c* (thereby not moving them) whereas in the active sections the pegs 320*a*-320*c* act on the corresponding clamps 210*a*-210*c* (thereby moving them).

Figure 4B:
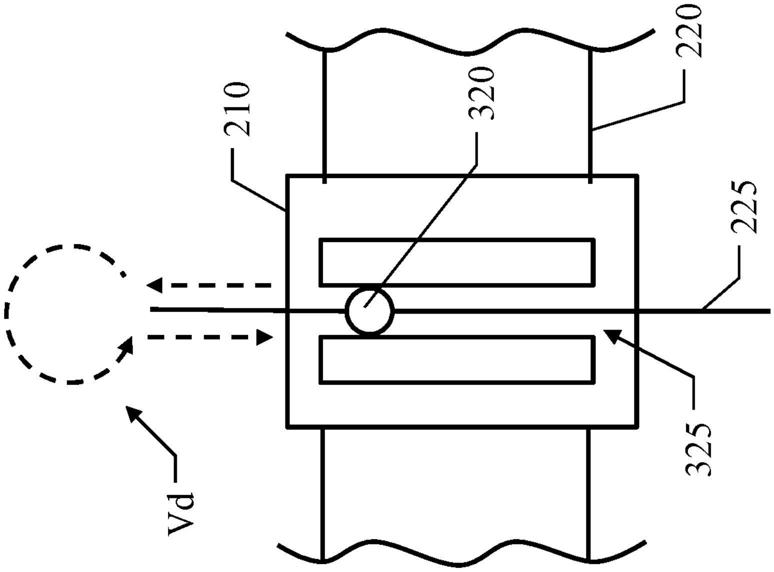
FIG. 4A-FIG. 4B show a schematic representation of different details of the bookbinding machine according to an embodiment of the present invention.
Figure 4A:
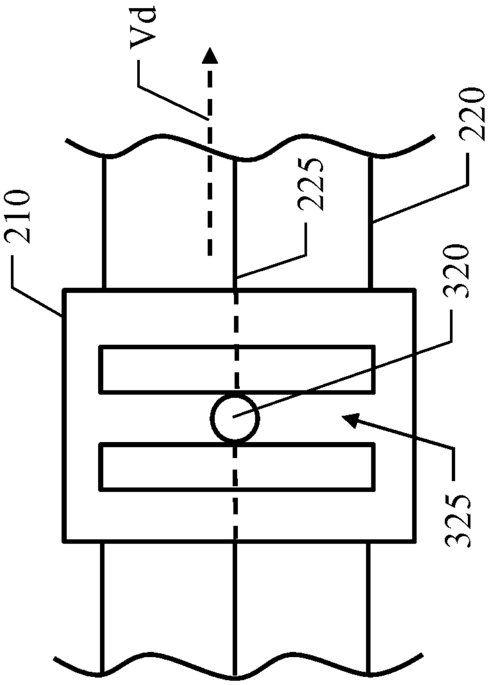

With reference now to FIG. 4A-FIG. 4B, a schematic representation is shown of different details of the bookbinding machine according to an embodiment of the present invention.

Starting from FIG. 4A, the figure shows a generic set of peg and clamp with its slit of the same perfect-binding machine of above, denoted without the corresponding suffixes for the sake of simplicity. The peg 320 is in an active section of the driving path 225 being coincident with a corresponding portion of the transport path 220 (i.e., superimposed to each other in plant view); in this condition, the peg 320 moves transversally to the slit 325. Therefore, the peg 320 moves with a driving speed Vd that has a component perpendicular to the slit 325; particularly, the figure relates to a straight portion of the transport path 220 and driving path 225, wherein the peg 320 moves perpendicularly to the slit 325 and then the whole driving speed Vd is perpendicular thereto. Therefore, in its movement the peg 320 abuts against a downstream wall of the slit 325 (without any relative freedom of movement); the clamp 210 then moves integral with the peg 320 at the same driving speed Vd along the guide 220.

Moving to FIG. 4B, the peg 320 is now in a passive section of the driving path 225; in this condition, the peg 320 moves non-transversally to the slit 325, i.e., longitudinally along and/or outside the slit 325. Therefore, in its movement (with the driving speed Vd) the peg 320 does not exert any force on the clamp 210 that then does not move. Particularly, in the figure the peg 320 moves in succession in a (start) portion longitudinally in a certain direction (such as upwards) to slide along the slit 325 and then exit from it, in a (central) portion outside the slit 325 and in an (end) portion longitudinally in an opposite direction (downwards in this case) to re-enter the slit 325 and then slide along it. As a result, the clamp 210 remains stationary (along the transport path 220) for a stop time corresponding to a length of the passive section of the driving path 225.

With reference now to FIG. 5A-FIG. 5D, qualitative time diagrams are shown of operation of the bookbinding machine according to an embodiment of the present invention.

The diagrams plot speed (i.e., its module, in arbitrary units on the ordinate axis) against time (in arbitrary units on the abscissa axis) of different components of the perfect-binding machine of above.

Figure 5A:
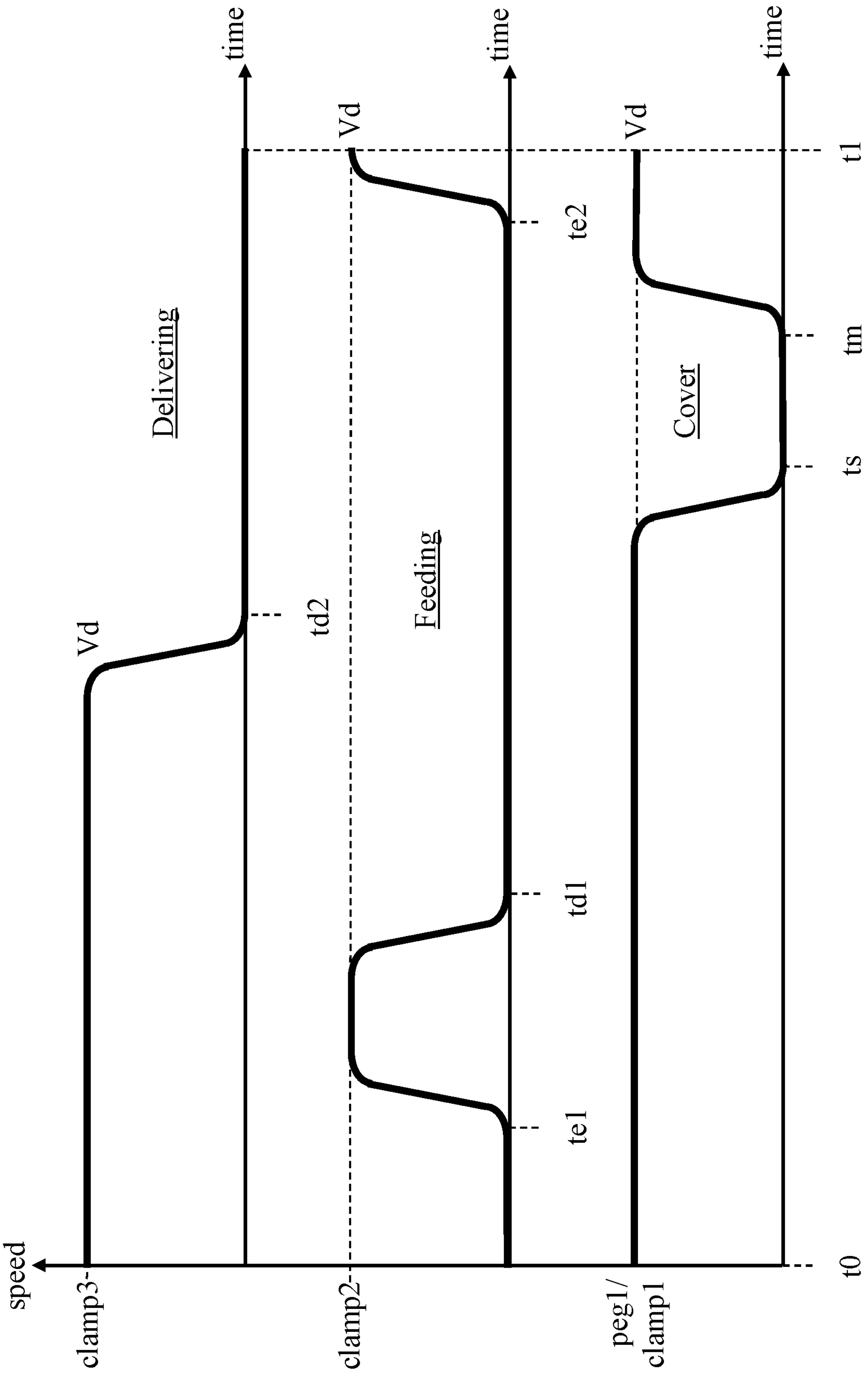
FIG. 5A-FIG. 5D show qualitative time diagrams of operation of the bookbinding machine according to an embodiment of the present invention.

Starting from FIG. 5A, for the sake of simplicity the case is considered wherein the driving speed Vd of the driving system (when moving) is constant. Taking as a reference for the driving system a generic peg thereof (peg1), a start condition is considered at a time t0 wherein the peg is upstream the movement processing stations (205*b* and 205*c* in FIG. 3). The driving system moves at the driving speed Vd up to when the peg reaches the engagement processing station, i.e., the cover application station in the example at issue (205*d* in FIG. 3); at this point, the driving system decelerates down to stop at a (stop) time ts. The driving system remains so for the time required to process the book block in the cover application station; thereafter, the driving system accelerates at a (moving) time tm up to reach the same driving speed Vd again. The driving system then moves at this driving speed Vd up to a time t1, wherein a following peg along the driving system reaches the same position of this peg at the time t0.

At the same time, the clamps move according to the movement of the corresponding pegs; for the sake of simplicity, the case is considered wherein the driving path in its active sections is coincident with the transport path, so that the clamps move therein integral with the corresponding pegs at the same driving speed Vd.

The above-mentioned peg moves from the time t0 to the time t1 along an active section of the driving path. Therefore, the corresponding clamp (clamp1) moves with the same motion law, thereby remaining stationary in the cover application station from the time ts to the time tm.

Considering instead the clamp corresponding to the following peg (clamp2), at the time t0 the peg is in the passive section of the disengagement processing station following the cover application station, i.e., the delivering station in the example at issue (205*e* in FIG. 3), so that the clamp is disengaged from the peg and then stationary in the delivering station. The peg leaves the delivering station entering a corresponding active section of the driving system at an (engagement) time te1 (preceding the time ts), after that the clamp engages with the peg and then moves at the same driving speed Vd. The peg reaches the other disengagement processing station following the delivering station, i.e., the feeding station in the example at issue (205*a* in FIG. 3) and then disengages from the peg at a (disengagement) time td1 (still preceding the time ts). The clamp remains stationary in the feeding station (while the peg moves along the corresponding passive section of the driving system) up to an (engagement) time te2 (following the time tm); at this point, the peg leaves the feeding station entering a corresponding active section of the driving system, after that the clamp engages with the peg and then moves at the same driving speed Vd. This continues up to the time t1, after that the peg follows the above-described motion law of the preceding peg (peg1).

Considering instead the clamp corresponding to the further following peg (clamp3), at the time t0 the peg is downstream the cover application station in the corresponding active section of the driving system; therefore, the clamp engages with the peg and then moves at the same driving speed Vd. The peg reaches the delivering station and then disengages from the peg at a (disengagement) time td2 (preceding the time ts). The clamp remains stationary in the delivering station (while the peg moves along the corresponding passive section of the driving system) up to the time t1, after that it follows the above-described motion law of the preceding peg (peg2).

In the solution according to an embodiment of the present invention, the driving system (repeatedly) stops for corresponding stop periods (from the time ts to the time tm). In each stop period a corresponding clamp is at the engagement processing station (or more), i.e., the clamp1 at the cover application station in the example at issue, engaged with the driving system; at the same time, corresponding one or more clamps are at the disengagement processing stations, i.e., the clamp2 at the feeding station and the clamp3 at the delivering station in the example at issue, disengaged from the driving system.

As described in detail in the following, in this way it is possible to control the clamp at will in the engagement processing station (cover application station) via the driving system with which it is engaged, without any repercussion on the clamps in the disengagement processing stations (feeding/delivering stations) from which they are instead disengaged.

Figure 5B:
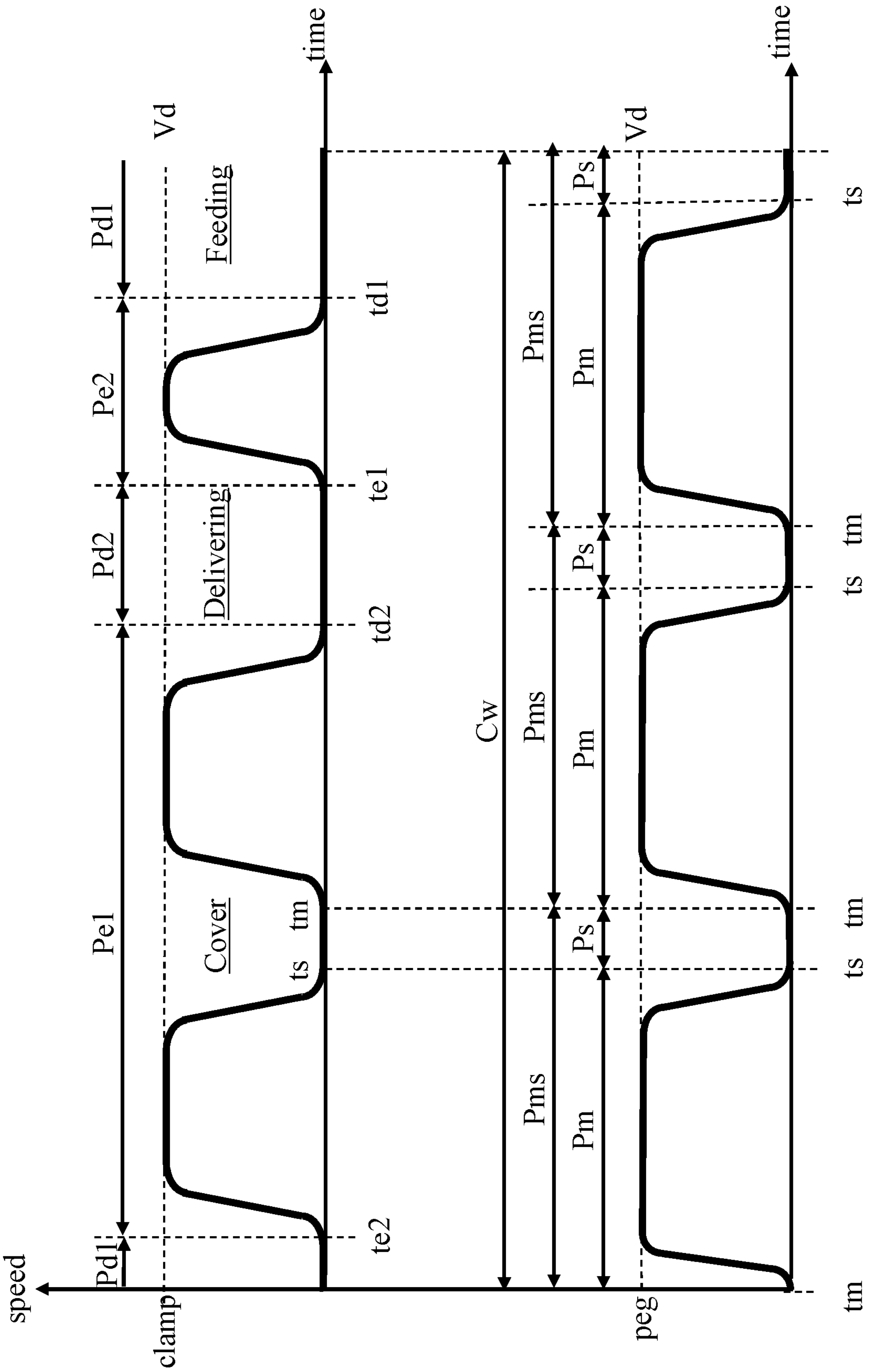

Moving to FIG. 5B, taking as a reference for the driving system a generic peg thereof, a start condition is considered wherein the (reference) peg is at the feeding station (disengaged from its clamp) at the end of a generic stop period (time tm in FIG. 5A). The driving system accelerates up to reach the driving speed Vd, and then moves at this driving speed Vd up to when the peg reaches the cover application station, after that is decelerates down to stop (time ts in FIG. 5A). The driving system remains so for the corresponding stop period (from time ts to time tm in FIG. 5A). This is repeated twice (to replicate the same behavior for the other two pegs) up to when the same start condition of above is reached again, i.e., the (reference) peg is at the feeding station at the end of the corresponding stop period. Therefore, the driving system continually repeats moving periods Pm (wherein the driving system moves) and stop periods Ps (wherein the driving system is stopped) that are alternated to each other. Each pair of consecutive moving period Pm and stop period Ps defines a corresponding moving/stop period Pms. During every working cycle Cw of the perfect-binding machine, the moving/stop periods Pms are repeated a number of times equal to a number of segments of the driving system, each defined between a pair of adjacent pegs (for corresponding clamps), three in the example at issue; the pegs are distributed uniformly along the driving system (i.e., its chain) to obtain equal segments, so as to reproduce the same behavior of the perfect-binding machine over time.

At the same time, in the start condition the clamp of the (reference) peg is stationary at the feeding station. As soon as the clamp engages with the peg (time te2 in FIG. 5A) the clamp accelerates up to reach the same driving speed Vd (time te2 in FIG. 5A), following the (preceding) stop period Ps by a non-null delay (from the time tm to the time te2). The clamp continues moving at this driving speed Vd up to when the peg reaches the cover application station, wherein the clamp (according to the same behavior of the driving system) decelerates down to stop, remains stationary for the corresponding stop period Ps, and then accelerates up to reach the driving speed Vd again (from the time ts to the time tm). The clamp continues moving at this driving speed Vd up to when the peg reaches the delivering station and disengaged from the driving system (time td2 in FIG. 5A), preceding the (following) stop period Ps by a non-null advance (from the time td2 to the time ts). As soon as the clamp engages with the peg again, it accelerates up to reach the same driving speed Vd again (time te1 in FIG. 5A), following the (preceding) stop period Ps by a non-null delay (from the time tm to the time te1). Likewise, the clamp continues moving at this driving speed Vd up to when the peg reaches the feeding station and disengaged from the driving system (time td1 in FIG. 5A), preceding the (following) stop period Ps by a non-null advance (from the time td1 to the time ts). The clamp remains stationary for the corresponding stop period Ps thereby returning to the start condition.

Therefore, each clamp continually repeats disengagement periods Pd1 and Pd2 (wherein the clamp is disengaged from the driving system at the feeding station and at the delivering station, respectively) and corresponding following engagement periods Pe1 and Pe2 (wherein the clamp is engaged with the driving system elsewhere) that are alternated to each other. Particularly, during every working cycle Cw of the perfect-binding machine, the pairs of disengagement period and engagement period Pd1-Pe1,Pd2-Pe2 are repeated a number of times equal to a number of the disengagement processing stations, two in the example at issue. The clamp remains stationary in the cover application station for a processing period equal to the corresponding stop period Ps. The clamp instead remains stationary in the feeding station and in the delivering station for corresponding processing periods equal to their disengagement periods Pd1 and Pd2, respectively, each equal to the stop period Ps plus a time required by each peg to travel across the corresponding passive section of the driving system (according to the driving speed Vd). The engagement period Pe1 comprising the processing at the cover application station is longer than the moving/stop period Pms, so as to ensure that whenever the driving system stops (with a peg in the cover application station) the other pegs are disengaged therefrom (in the feeding/delivering stations).

The above-described solution offers a number of advantages.

Particularly, in an embodiment of the present invention, it is possible to adjust the stop periods Ps (dynamically), and then the processing period of the book blocks in the cover application station. For example, the production of the books is typically performed in (processing) jobs, each involving the processing of a certain number of book blocks of a same type. Before every processing job, the operator enters corresponding configuration information by the touch-screen (for example, number of book blocks, their size and so on). In the solution according to an embodiment of the present invention, at the same time the operator may also enter an indication of the processing period of the book blocks in the cover application station (such as its desired value). The control unit then sets the stop period Ps to this processing period for all the book blocks of the processing job. Alternatively, the control unit may determine the stop period Ps automatically according to geometrical information of the book blocks of the processing job (comprised in its configuration information).

As a result, it is possible to optimize the processing period for the book blocks in the cover application station for the different characteristics of the book blocks of the processing jobs individually; this significantly increases the quality of the corresponding books.

This is advantageous with respect to the known disengagement machines. Indeed, in the solution according to an embodiment of the present invention the modification of the processing period in the cover application station does not affect the processing of the book blocks in the other processing stations. Particularly, this has no impact on the driving speed Vd and then on the processing of the book blocks in the movement processing stations. All of the above not only significantly facilitates a control of the movement processing stations but it allows designing them according to a specific optimal processing speed Vd. Therefore, no compromise is required between optimal design (ensuring high quality) and yield of the perfect binding machine. In the known disengagement machines, instead, the only possibility for changing the processing period in any processing station (wherein the clamp remains stationary thanks to its disengagement from the driving system always moving at the same constant driving speed) is to change the driving speed accordingly; this may adversely affect the quality of the operations performed in the movement processing stations, and it adversely affects the yield of the perfect-binding machine when the driving speed is reduced to increase the processing period. Moreover, in the solution according to an embodiment of the present invention, when the stop period Ps is shortened the working cycle Cw is shortened as well, with a corresponding increase of the yield of the perfect-binding machine. This is advantageous with respect to the known fixed machines, wherein the stop period is always equal to the longest one of all the stationary processing stations.

In addition or in alternative, in an embodiment of the present invention, it is possible to adjust the moving periods Pm (dynamically), and accordingly a stop position of the pegs and then of the corresponding clamps in the cover application station.

For example, the segments of the driving system may have (slightly) different lengths, such as because of errors caused by tolerances, wearing and so on; as a result, the corresponding pegs, and then their clamps, may stop at different stop positions in the cover application station. In a test mode of the perfect-binding machine (selected by the operator via the touch-screen), or automatically during its production mode, the control unit measures (via the corresponding sensor) the displacement between each book block and the corresponding cover in the cover application station (when the corresponding clamp is stationary therein). The control unit determines the displacement for each segment of the driving system, according to the displacement of the clamp of the corresponding peg at the end thereof (such as equal to an average of multiple values thereof). The control unit calculates a time adjustment for the moving period Pm of each segment of the driving system for compensating the corresponding displacement. The control unit then controls the driving system to move each segment of the driving system, when its peg is reaching the cover application station, for the moving period Pm adjusted according to the corresponding time adjustment so as to ensure that the peg, and then the clamp, always stop at the correct stop position therein. As a result, it is possible to compensate any inaccuracies of the driving system, thereby ensuring that the book blocks are always processed in the cover application station in the correct stop position; this significantly increases the quality of the corresponding books.

As a further example, before every processing job the operator enters an indication of the stop position for the clamps in the cover application station (such as in terms of relative position between each book block and cover when the corresponding clamp is stationary therein, like at the middle of the cover, aligned with or at certain distance from a longitudinal end of the cover, and so on). The control unit calculates the value of the moving period Pm required to stop the clamps at this stop position in the cover application station. The control unit then controls the driving system to move each segment of the driving system for this moving period Pm. As a result, it is possible to adapt the processing of the book blocks in the cover application station according to different requirements of the processing jobs.

In both cases, the modification of the moving periods Pm (either for correcting errors of the stop position due to inaccuracies of the driving system or for changing the stop position to comply with the requirements of the processing jobs) has no effect on the stop position of the clamps in the delivering/feeding station; indeed, assuming that the other pegs are in the corresponding passive sections of the driving system in positions spaced apart from any adjacent active sections of the driving system (behind and ahead) by more than a maximum allowable change of the stop position resulting from the adjustment of the moving periods Pm (for example, 0.1-1.0 mm and 1-20 mm for correcting and changing, respectively, the stop position), the pegs at the delivering/feeding stations remain disengaged from the driving system.

This is impossible in the known disengagement machines, since the clamps are disengaged from the driving system at all the stationary processing stations. Moreover, this is advantageous with respect to the known fixed machines, wherein any modification of the moving periods to correct the stop position of the clamps in a specific stationary processing station would adversely affect the stop position of the clamps in the other stationary processing stations.

In addition or in alternative, in an embodiment of the present invention, it is possible to adjust the stop position of each peg, and then of the corresponding clamp, in the cover application station individually.

For example, in the production mode of the perfect-binding machine, as soon as each peg, and then the corresponding clamp, has stopped in the cover application station, the control unit measures (via the corresponding sensor) the displacement between the book block and the cover (before processing the book block). If the book block is not aligned with the cover (i.e., the displacement exceeds an acceptable threshold in absolute value), the control unit controls the driving system to move for adjusting the stop position of the peg, and then of the clamp, according to the displacement (so as to remove it, or at least reduce it below the acceptable threshold); particularly, when the book block is ahead the cover the driving system moves backwards (by a distance opposite the displacement), whereas when the book block is behind the cover the driving system moves forwards (by a distance equal to the displacement). The book blocks are then processed in the cover application station in this (adjusted) stop position.

As a result, it is possible to compensate any misalignment between the book blocks and the covers (for example, due to mechanical inaccuracies, changes in the covers resulting from their creasing and so on), thereby ensuring that the book blocks are always processed in the cover application station correctly aligned with the covers (without the need of moving the cover); this significantly increases the quality of the corresponding books. In this case well, the adjustment of the stop position in the cover application station has no effect on the stop position of the clamps in the delivering/feeding station; indeed, as above assuming that the other pegs are in the corresponding passive sections in positions spaced apart from any adjacent active sections of the driving system by more than a maximum allowable adjustment of the stop position (for example, 0.1-1.0 mm), the pegs at the delivering/feeding stations remain disengaged from the driving system.

As above, this is impossible in the known disengagement machines, since the clamps are disengaged from the driving system at all the stationary processing stations. Moreover, this is again advantageous with respect to the known fixed machines, wherein any modification of the stop position of the clamps in a specific stationary processing station would adversely affect the stop position of the clamps in the other stationary processing stations.

More generally, the above-described solution provides a structure that may be controlled in a simple way, thanks to the single driving system for all the clamps; this allows limiting the cost of the perfect-binding machine, with a beneficial effect on a production cost of the books as well.

The perfect-binding machine has a compact design, thanks to the passive sections of the driving system.

The perfect-binding machine has a limited downtime, since the driving system is stopped only for the shortest processing period (in the cover application station).

This solution is very flexible, since it allows adjusting the processing of the book blocks in the cover application station at will, with a corresponding increase of the production quality.

Figure 5C:
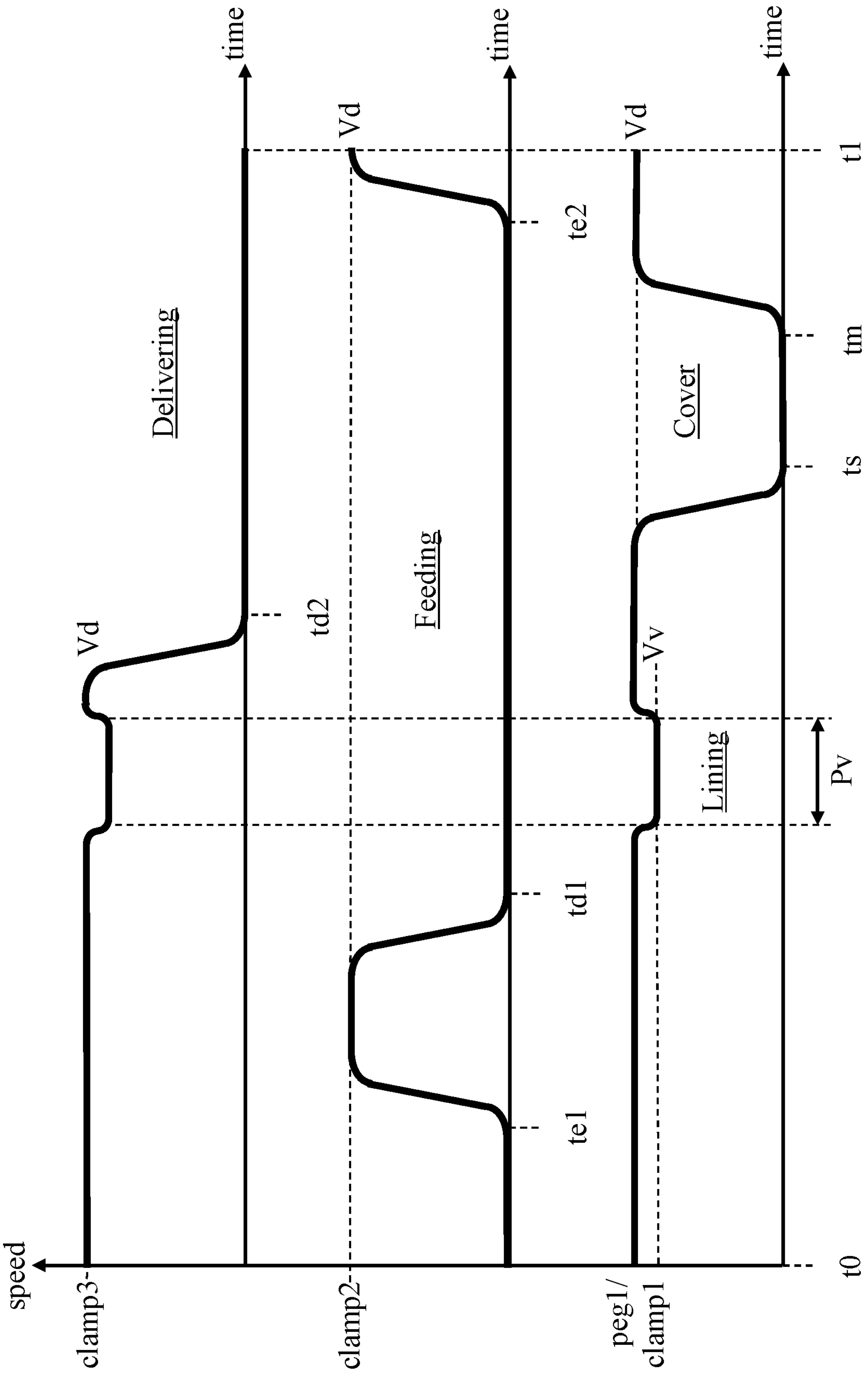

Moving to FIG. 5C, the book blocks are processed in the movement processing stations while they are crossing them at a processing speed equal to the driving speed Vd. In the solution according to an embodiment of the present invention, the driving speed Vd varies over time. For example, the driving speed Vd is varied in a (variation) period Pv during which a generic peg (peg1) is moving along the active section of the driving path crossing a specific movement processing station (such as the lining station); particularly, the driving Vd is varied to a value, referred to as variation speed Vv, equal to a desired processing speed (different from the driving speed Vd) of the book blocks crossing the lining station for their processing (lower than the driving speed Vd in the example at issue, with similar considerations that apply when the processing speed is higher than the driving speed Vd). The variation speed Vv and the variation period Pv may be pre-defined statically (according to the characteristics of the perfect-binding machine), selected dynamically (by the operator with the touch-screen, globally or individually per each processing job) or determined automatically (according to the geometrical information of the book blocks of the processing job). The corresponding clamp moves with the same motion law, so that its book block crosses the lining station with the desired variation speed Vv.

As a result, it is possible to optimize the processing speed of the book blocks (in the movement processing stations) according to the different characteristics of the movement processing stations (globally) and/or of the book blocks of the processing jobs (individually); this further increases the quality of the corresponding books. The modification of the driving speed Vd has no impact on the processing of the book blocks in the other processing stations. Indeed, in the variation period Pv the other clamps are disengaged from the driving system (such as the clamp2 stationary in the feeding station) and/or they are moving away from all the processing stations (such as the clamp3 moving at the same variation speed Vv).

Figure 5D:
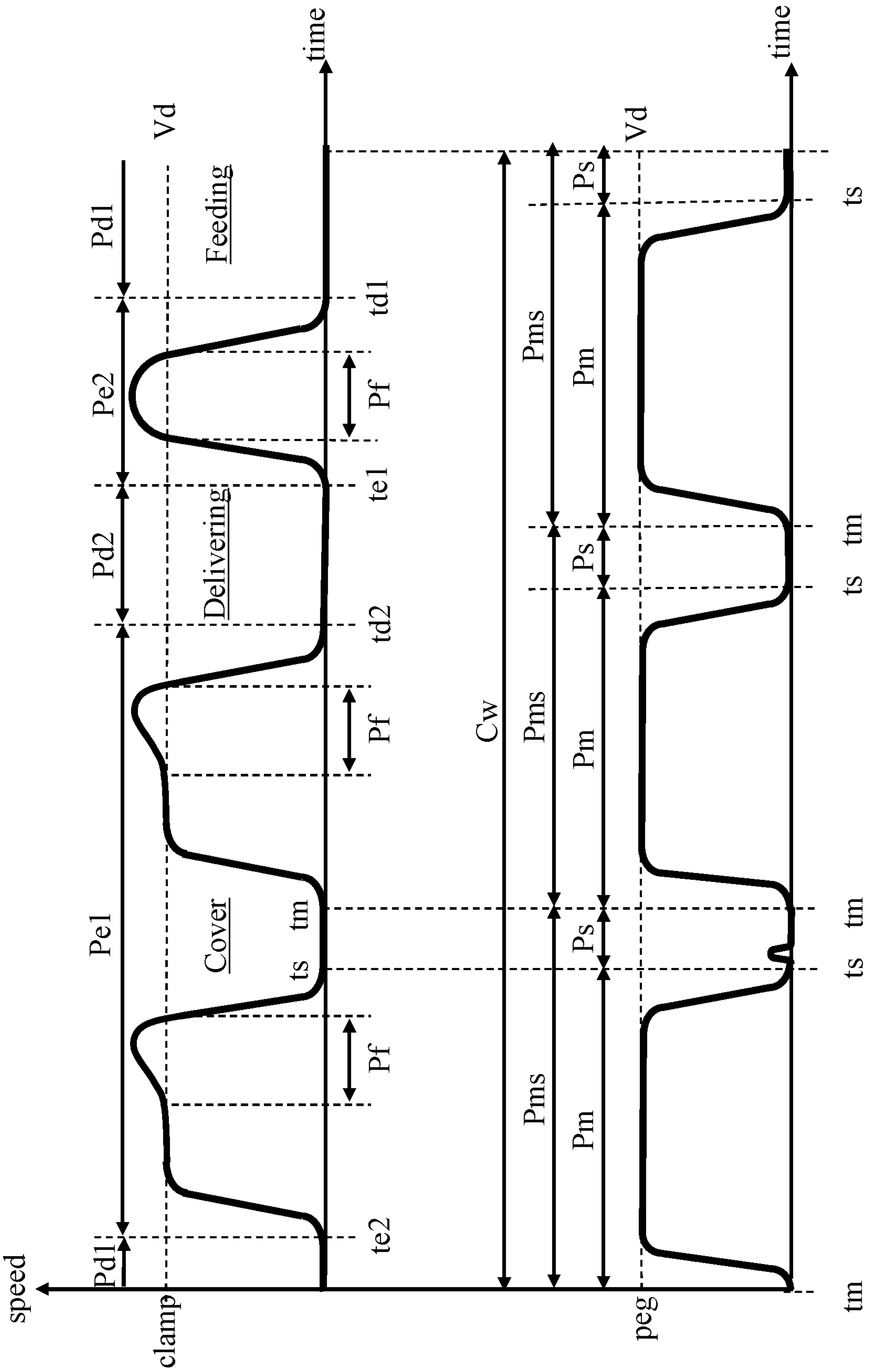

Moving to FIG. 5D, the same motion law as above of the driving system with constant driving speed Vd is shown, with the addition of the movement (by accelerating and then decelerating) for adjusting the stop position in the cover application station at the beginning of the first stop period Ps (forwards in the example at issue, with similar considerations that apply when the stop position is adjusted backwards and/or in other stop periods Ps).

In the solution according to an embodiment of the present invention, the driving path in its active sections may differ from the transport path. Particularly, the driving path has curved portions of the active sections, away from the processing stations, wherein it extends inside corresponding curved portions of the transport path (in plant view), each one between a pair of common points wherein the driving path and the transport path are coincident (in plant view). Since the curved portion of the driving path is shorter than the curved portion of the transport path between the common points, the clamp necessarily moves faster than the peg does (by sliding and rotating with respect thereto) in corresponding (fast) periods Pf. For example, this happens before reaching the delivering station (arc above to the left in FIG. 3), before reaching the feeding station (arc below to the left in FIG. 3) and between the movement processing stations and the cover application station (half-circle to the right in FIG. 3).

The above-described feature allows reducing the length of the curved portion of the driving system, for the same length of the curved portion of the transport path (with a sufficiently high curvature radius providing a smoother movement of the clamps). Moreover, the corresponding reduction of the driving system (i.e., its chain) is replicated in all its segments (to maintain the pegs uniformly distributed along the driving system). This has a beneficial effect on the size and on the yield of the perfect-binding machine.

Moreover (not shown in the figure), the driving path may have one or more (oblique) portions of the active sections, each running obliquely to a corresponding straight portion of the transport path at one or more movement processing stations (for example, forming an angle of 5-70°). Each peg in the oblique portion of the driving path moves with a driving speed (tangential thereto), which has a component perpendicular to the slit (which moves the clamp integral with the peg) and a component longitudinal along the slit (which causes the peg to slide along it). The clamp then moves along the guide at a speed lower than the driving speed of the peg. The above-described feature allows reducing the speed of the clamps across any movement processing stations (for example, to improve a quality of the corresponding processing). This result is achieved without changing the driving speed of the driving system, and then without adversely affecting the yield of the perfect-binding machine.

Modifications

Naturally, in order to satisfy local and specific requirements, a person skilled in the art may apply many logical and/or physical modifications and alterations to the present invention. More specifically, although this invention has been described with a certain degree of particularity with reference to one or more embodiments thereof, it should be understood that various omissions, substitutions and changes in the form and details as well as other embodiments are possible. Particularly, different embodiments of the present invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present invention may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms “substantially”, “about”, “approximately” and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a bookbinding machine. However, the bookbinding machine may be of any type (for example, a perfect-binding machine, a case-in machine and so on).

In an embodiment, the bookbinding machine comprises a plurality of processing stations for processing book blocks. However, the processing stations may be in any number, at any position and of any type (for example, only stationary ones, stationary ones and movement ones, and so on) and they may be used for processing any book blocks (for example, formed by signatures, flat sheets, with or without inserts, sewn, glued, stapled or collected in any other way, and so on).

In an embodiment, the processing stations comprise a plurality of stationary processing stations for processing the book blocks while stationary therein, the stationary processing stations comprising at least one engagement processing station and one or more disengagement processing stations. However, the engagement processing stations may be in any number and of any type (for example, a cover application station, an end-papering station and so on); likewise, the disengagement processing stations may be in any number and of any type (for example, an automatic feeding station, a manual feeding station, a delivering station, a pressing station and so on).

In an embodiment, the bookbinding machine comprises a plurality of transport elements for transporting the book blocks individually. However, the transport elements may be in any number and of any type (for example, clamps, belts, holders, grippers and so on).

In an embodiment, the bookbinding machine comprises a driving system for driving the transport elements in succession across the processing stations selectively. However, the driving system may be of any type (for example, of mechanical type, magnetic type, with or without a guide for the transport elements, and so on). The selective driving of the transport elements may be implemented in any way (for example, with driving elements in the driving system corresponding to the transport elements, with engagement elements in the transport elements, with a passive or active structure, and so on).

In an embodiment, each of the transport elements is driven by the driving system when engaged therewith and it remains stationary when disengaged therefrom. However, the transport elements may be driven in any way when engaged (for example, at the same speed when integral with the driving system, at a different speed when movable with respect to the driving system and so on); moreover, the transport elements may be disengaged in any way (for example, still in contact with the driving system but without applying any force, separate from the driving system and so on).

In an embodiment, the bookbinding machine comprises control means. However, the control means may be implemented in any way (for example, with any control unit, such as a computer, a micro-controller and the like, a mechanical system, and so on).

In an embodiment, the control means are configured to stop the driving system repeatedly for corresponding stop periods. However, the driving system may be stopped in any way (for example, with any deceleration) for any stop periods (for example, of any value, fixed, variable globally or individually for each processing job, equal to the processing period of a single engagement processing station or to the longest processing period of multiple engagement processing stations, and so on).

In an embodiment, in each of the stop periods corresponding at least one of the transport elements are at the engagement processing station engaged with the driving system, and corresponding one or more of the transport elements are at the disengagement processing stations disengaged from the driving system. However, this operative condition may be reached in any way (for example, with the transport elements that disengage at the disengagement processing stations before the corresponding transport element reaches the engagement processing station or at the same time, with the transport elements that engage at the disengagement processing stations after the corresponding transport element leaves the engagement processing station or at the same time, and so on).

Further embodiments provide additional advantageous features, which may however be omitted at all in a basic implementation.

Particularly, in an embodiment the control means are configured to move the driving system repeatedly for corresponding moving periods alternated with the stop periods. However, the moving periods may be of any type (for example, of any value, fixed, variable globally or individually for each processing job, and so on).

In an embodiment, in each of the moving periods corresponding at least one of the transport elements at the engagement processing station in a preceding one of the stop periods is engaged with the driving system from the preceding stop period up to a reaching of a following one of the stationary processing stations. However, the possibility is not excluded of disengaging each transport element while moving from the engagement processing station to the following stationary processing station (at a position away from all the processing stations).

In an embodiment, in each of the moving periods corresponding one or more of the transport elements at the disengagement processing stations in the preceding stop period remain disengaged from the driving system from the preceding stop period to an engagement time (following the preceding stop period by a non-null delay) and engage with the driving system from the engagement time up to a reaching of corresponding following ones of the stationary processing stations. However, the delay may be of any value (down to zero, for example, when the moving period may not be increased and/or the stop position may not be moved forwards); moreover, the possibility is not excluded of disengaging each transport element while moving from any disengagement processing station to the following stationary processing station (at a position away from all the processing stations).

In an embodiment, in each of the moving periods at least one of the transport elements corresponding to the engagement processing station is engaged with the driving system from a leaving of a preceding one of the stationary processing stations up to a reaching of the engagement processing station at a following one of the stop periods. However, the possibility is not excluded of disengaging each transport element while moving from the preceding stationary processing station to the engagement processing station (at a position away from all the processing stations).

In an embodiment, in each of the moving periods one or more of the transport elements corresponding to the disengagement processing stations are engaged with the driving system from a leaving of corresponding preceding ones of the stationary processing stations up to a disengagement time (preceding the following stop period by a non-null advance) and disengaging from the driving system from the disengagement time to the following stop period. However, the advance may be of any value (down to zero, for example, when the moving period may not be decreased and/or the stop position may not be moved backwards); moreover, the possibility is not excluded of disengaging each transport element while moving from the preceding stationary processing station to any disengagement processing station (at a position away from all the processing stations).

In an embodiment, the control means are configured to move the driving system during the moving periods with a driving speed varying over time. However, the driving speed may be varied in any way (for example, with periods at lower and/or higher constant speed, with any acceleration/deceleration or more generally with any other motion law, globally or individually for each processing job, and so on). In any case, the possibility is not excluded of always having a constant driving speed (for example, fixed, customizable, self-adapting and so on).

In an embodiment, the control means are configured to adjust the stop periods. However, the stop periods may be adjusted in any way (for example, manually, automatically, such as according to one or more characteristics of the processed book blocks being measured via corresponding sensors, globally or individually for the processing jobs, and so on).

In an embodiment, the bookbinding machine comprises an input unit. However, the input unit may be of any type (for example, a touch-screen, a keypad, a reader of any codes, such as barcodes, QRcodes and the like, an OCR device, a network interface card and so on).

In an embodiment, the input unit is for entering an indication of a processing period in the engagement processing station. However, the processing period may be indicated in any way (for example, by its value, a delta with respect to a default value, for a processing job or in general, and so on).

In an embodiment, the indication of the processing period is for one or more of the book blocks of a processing job. However, the processing job may comprise any number of book blocks and its processing period may be provided in any way (for example, entered manually, read from the book blocks, received over a network and so on).

In an embodiment, the control means are configured to set the stop periods for the book blocks of the processing job to the processing period. However, the stop periods may be set in any way (for example, maintaining the new value up to a next change thereof, returning to the default value automatically at the end of the processing job and so on).

In an embodiment, the control means are configured to adjust the moving periods. However, the moving periods may be adjusted in any way (for example, manually, automatically, such as according to one or more characteristics of the processed book blocks being measured via corresponding sensors, globally or individually for the processing jobs, and so on).

In an embodiment, the booking machine comprises a sensor for measuring corresponding displacements of the book blocks at the engagement processing station in the stop periods. However, the sensor may be of any type (for example, optical, mechanical and so on) for measuring any displacement (for example, between the book block and a cover, an end-paper, a fastening lining, quantitatively or qualitatively, and so on). The sensors may be arranged at any position (for example, in the engagement processing station for measuring the displacement before, during or after the processing of the book blocks, in the delivering station for measuring the displacement on the processed book blocks and so on).

In an embodiment, the control means are configured to calculate corresponding time adjustments for the transport elements according to the corresponding displacements. However, the time adjustments may be calculated in any way (for example, equal to any central statistical parameter like the average, the median, the mode of any number of multiple displacements, equal to a single displacement and so on).

In an embodiment, the control means are configured to adjust the moving periods for the transport elements reaching the engagement processing station according to the corresponding time adjustments. However, the moving periods may be adjusted in any way according to the time adjustments (for example, totally by the opposite of the time adjustment, incrementally by a percentage thereof and so on). This operation may be performed at any time (for example, in test mode at the installation and/or at any maintenance of the bookbinding machine, in production mode periodically or after any number of processing jobs, and so on).

In an embodiment, the input unit is for entering an indication of a stop position in the engagement processing station. However, the stop position may be indicated in any way (for example, by its value, a delta with respect to a default value, for a processing job or in general, and so on).

In an embodiment, the indication of the stop position is for one or more of the book blocks of a processing job. However, the processing job may be of any type (see above) and its stop position may be provided in any way (for example, either the same or different with respect to the processing period).

In an embodiment, the control means are configured to adjust the moving periods for the book blocks of the processing job according to the stop position. However, the moving periods may be adjusted in any way (for example, maintaining the new value up to a next change thereof, returning to the default value automatically at the end of the processing job and so on).

In an embodiment, the bookbinding machine comprises corresponding at least one sensor at the engagement processing station for measuring (in each of the stop periods) a displacement of the corresponding book block at a stop position in the engagement processing station before the processing thereof. However, the sensor may be of any type for measuring any displacement (for example, the same sensor as above, a further sensor of the same or different type, and so on). The displacement may be measured at any time before the processing of the book block (for example, at the stop time, with a certain delay from it, as soon as a further sensor detects that the book block is stationary and so on).

In an embodiment, the control means are configured to control the driving system (in each of the stop periods) to adjust the stop position of the corresponding book block according to the displacement for the processing thereof. However, the stop position may be adjusted in any way (for example, in an open loop technique by correcting the position entirely according to the displacement, in a closed loop technique by modifying the position continually until it is correct and so on). Particularly, it is possible to measure the displacement, to calculate a movement required to compensate the displacement and then to move the transport element accordingly. Alternatively, it is possible to determine a direction of the displacement (such as book block too ahead or too behind), moving the transport element by a predetermined distance in the opposite direction (backwards when too ahead or forwards when to behind) until the position is correct.

In an embodiment, the bookbinding machine comprises a guide for guiding the transport elements along a closed transport path crossing the processing stations. However, the guide may be of any type (for example, a rail, a track and so on) and it may extend along any closed transport path (for example, oval, circular, irregular and so on).

In an embodiment, the driving system extends along a closed driving path. However, the driving system may extend along any closed transport path (for example, with sections coincident with and sections separate from the transport path, always coincident with the transport path, always separate from the transport path and so on).

In an embodiment, the driving path comprises corresponding passive sections extending away from the transport path at the disengagement processing stations wherein the transport elements disengage from the driving system. However, the passive sections may be of any type (for example, at any distance from the transport path, leaving each disengagement processing station and returning to the disengagement processing station at the same point or at different points, and so on).

In an embodiment, the driving path comprises a plurality of active sections corresponding to the transport path elsewhere wherein the transport elements engage with the driving system. However, the active sections may be of any type (for example, coincident, parallel, oblique with respect to the transport path and so on).

In an embodiment, the driving system comprises corresponding driving elements for the transport elements distributed uniformly along the driving system that are integral therewith. However, the driving elements may be of any type (for example, pegs, studs, hooks, carriers and so on); moreover, the possibility is not excluded of having the transport elements that are provided with elements capable of engaging with and disengaging from a uniform driving system.

In an embodiment, the driving elements act on the corresponding transport elements in the active sections and do not act on the corresponding transport elements 5 in the passive sections. However, the driving elements may act and not act on the transport elements in any way (for example, by pushing, pulling and so on and by sliding, detaching and so on, respectively).

In an embodiment, the driving system comprises an endless conveyor running along the driving path. However, the conveyor may be of any type (for example, a chain, a belt and so on).

In an embodiment, the driving system comprises a motor for driving the endless conveyor. However, the motor may be of any type (for example, a servomotor, a step motor and so on).

In an embodiment, the driving elements comprise corresponding pegs integral with the endless conveyor. However, the pegs may be of any type (for example, with any cross-section, length and so on) and they may be integral with the conveyor in any way (for example, extending downwards, upwards, laterally and so on).

In an embodiment, the transport elements have corresponding slits each for receiving the corresponding peg. However, the slits may be of any type (for example, with any length, defined by walls with the same or different size, extending radially, tangentially, horizontally, vertically and so on).

In an embodiment, the driving system is configured to move each of the pegs in the active sections transversally to the corresponding slit. However, in the active sections the peg may move transversally to the slit in any way (for example, perpendicularly, obliquely and so on).

In an embodiment, the driving system is configured to move each of the pegs in the passive sections longitudinally along and/or outside the corresponding slit. However, in the passive sections the peg may move in any way different from transversally within the slit (for example, always along the slit, leaving and then re-entering the slit, and so on).

In an embodiment, the transport path and the driving path are curved away from the processing stations (between at least one pair of common points wherein the transport path and the driving path coincide). However, the curved portions of the transport/driving paths may be in any number and of any type (for example, with constant or with varying curvature radius, with or without straight portions between the common points, and so on).

In an embodiment, between the pair of common points the driving path comprises an internal portion of one of the active sections extending inside a corresponding external portion of the transport path (wherein each of the pegs slides along the corresponding slit, thereby causing the corresponding transport element to move faster than the driving system). However, the internal portion and the external portion may be at any distance (for example, increasing/decreasing uniformly, with an irregular trend and so on) to achieve any difference of speed (for example, constant or varying along the curved portion of the transport path, and so on).

In an embodiment, the processing stations comprise one or more movement processing stations for processing the book blocks while moving thereacross. However, the movement processing stations may be in any number (down to none) and of any type (for example, pressing station, milling station, gluing station and so on).

In an embodiment, the movement processing stations are arranged along the active sections at corresponding straight portions of the transport path. However, the movement processing stations may be arranged in any way (for example, a single one or two or more consecutive ones per straight portion, all together in the same straight portion or distributed across two or more of them, and so on); in any case, the possibility is not excluded of having some movement processing stations in portions of the transport path that are curved.

In an embodiment, at least one of the active sections at the movement processing stations comprises an oblique portion of the driving path extending obliquely to the corresponding straight portion of the transport path (wherein each of the pegs moves obliquely to the corresponding slit, thereby causing the corresponding transport element to move slower than the driving system). However, the oblique portion may extend at any angle (for example, moving away and then moving close uniformly at the same or different rate, with an irregular trend, such as moving away, in parallel and then close, and so on) to achieve any difference of speed (for example, constant or varying along the corresponding straight portion of the transport path, and so on).

In an embodiment, the processing stations are adapted to be driven individually. However, the possibility is not excluded of one or more groups of (two or more) processing stations that are driven together (up to all).

In an embodiment, the bookbinding machine is a perfect-binding machine. However, the perfect-biding machine may be of any type (for example, of automatic/manual type, for applying covers with or without end-papers/linings and so on).

In an embodiment, the engagement processing station is a cover application station for applying corresponding covers to the book blocks. However, the covers may be of any type (for example, soft, rigid and so on).

In an embodiment, the sensor is for measuring the displacement between the book block of each of the transport elements at the engagement processing station and the corresponding cover. However, the displacement may be measured in any way (for example, by detecting the position of both the book block and the cover, by detecting the position of the book block and comparing it with a known position of the cover and so on).

A further embodiment provides a bookbinding plant comprising one or more of the above-described bookbinding machines. However, the bookbinding plant may be of any type (for example, with any number of these bookbinding machines and any number and type of further bookbinding machines, such as gathering machines, sewing machines, case-in machines, trimming machines and so on).

Generally, similar considerations apply if the bookbinding machine and the bookbinding plant each has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

A further embodiment provides a method for operating a bookbinding machine. In an embodiment, the method comprises processing book blocks in a plurality of processing stations. In an embodiment, the processing stations comprise a plurality of stationary processing stations (comprising at least one engagement processing station and one or more disengagement processing stations) wherein the book blocks are processed while stationary therein. In an embodiment, the method comprises transporting the book blocks individually by a plurality of transport elements. In an embodiment, the method comprising driving the transport elements in succession across the processing stations selectively by a driving system. In an embodiment, each of the transport elements is driven by the driving system when engaged therewith and remains stationary when disengaged therefrom. In an embodiment, control means of the bookbinding machine stop the driving system repeatedly for corresponding stop periods. In an embodiment, in each of the stop periods corresponding at least one of the transport elements is at the engagement processing station engaged with the driving system and corresponding one or more of the transport elements are at the disengagement processing stations disengaged from the driving system. However, the same considerations pointed out above with respect to the features of the bookbinding machine apply to the corresponding steps of the method as well.

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

A further embodiment provides a computer program configured for causing a control unit of a bookbinding machine to perform the above-described method when the computer program is executed on the control unit. A further aspect provides a computer program product comprising a computer readable storage medium embodying a computer program, the computer program being loadable into a working memory of a control unit of a bookbinding machine thereby configuring the control unit to perform the same method. However, the program may take any form suitable to be used by any control unit (see above), such as in the form of external or resident software, firmware, or microcode (either in object code or in source code, for example, to be compiled or interpreted). Moreover, it is possible to provide the program on any computer readable storage medium of tangible type, different from transitory signals per se (which may retain and store instructions for use by the control unit, such as of electronic, magnetic, optical, electromagnetic, infrared, or semiconductor type, like fixed disks, removable disks, memory keys and so on). In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

The invention claimed is:

1. A bookbinding machine comprising a plurality of processing stations for processing book blocks, the processing stations comprising a plurality of stationary processing stations for processing the book blocks while stationary therein, the stationary processing stations comprising at least one engagement processing station and one or more disengagement processing stations, a plurality of transport elements for transporting the book blocks individually, a driving system for driving the transport elements in succession across the processing stations selectively, each of the transport elements being driven by the driving system when engaged therewith and remaining stationary when disengaged therefrom, wherein the bookbinding machine comprises control means configured to stop the driving system automatically for a number of stop periods equal to a number of the transport elements in each working cycle of the bookbinding machine during operations thereof, in each of the stop periods:

corresponding at least one of the transport elements being at the engagement processing station engaged with the driving system, and corresponding one or more of the transport elements being at the disengagement processing stations disengaged from the driving system.

2. The bookbinding machine according to claim 1, wherein the control means are configured to move the driving system automatically for corresponding moving periods alternated with the stop periods in each working cycle of the bookbinding machine during operation thereof, in each of the moving periods:

corresponding at least one of the transport elements at the engagement processing station in a preceding one of the stop periods being engaged with the driving system from the preceding stop period up to a reaching of a following one of the stationary processing stations, corresponding one or more of the transport elements at the disengagement processing stations in the preceding stop period remaining disengaged from the driving system from the preceding stop period to an engagement time following the preceding stop period by a non-null delay and engaging with the driving system from the engagement time up to a reaching of corresponding following ones of the stationary processing stations, at least one of the transport elements corresponding to the engagement processing station being engaged with the driving system from a leaving of a preceding one of the stationary processing stations up to a reaching of the engagement processing station at a following one of the stop periods, and one or more of the transport elements corresponding to the disengagement processing stations being engaged with the driving system from a leaving of corresponding preceding ones of the stationary processing stations up to a disengagement time preceding the following stop period by a non-null advance and disengaging from the driving system from the disengagement time to the following stop period.

3. The bookbinding machine according to claim 2, wherein the control means are configured to move the driving system during the moving periods with a driving speed varying over time.

4. The bookbinding machine according to claim 2, wherein the control means are configured to adjust the moving periods.

5. The bookbinding machine according to claim 4, wherein the bookbinding machine comprises a sensor for measuring corresponding displacements of the book blocks at the engagement processing station in the stop periods, the control means being configured to calculate corresponding time adjustments for the transport elements according to the corresponding displacements and to adjust the moving periods for the transport elements reaching the engagement processing station according to the corresponding time adjustments.

6. The bookbinding machine according to claim 4, wherein the bookbinding machine comprises an input unit for entering an indication of a stop position in the engagement processing station of one or more of the book blocks for a processing job, the control means being configured to adjust the moving periods for the book blocks of the processing job according to the stop position.

7. The bookbinding machine according to claim 1, wherein the control means are configured to adjust the stop periods.

8. The bookbinding machine according to claim 7, wherein the bookbinding machine comprises an input unit for entering an indication of a processing period in the engagement processing station for one or more of the book blocks of a processing job, the control means being configured to set the stop periods for the book blocks of the processing job to the processing period.

9. The bookbinding machine according to claim 1, wherein the bookbinding machine comprises corresponding at least one sensor at the engagement processing station for measuring, in each of the stop periods, a displacement of the corresponding book block at a stop position in the engagement processing station before the processing thereof, the control means being configured to control the driving system, in each of the stop periods, to adjust the stop position of the corresponding book block according to the displacement for the processing thereof.

10. The bookbinding machine according to claim 1, wherein the bookbinding machine comprises a guide for guiding the transport elements along a closed transport path crossing the processing stations, wherein the driving system extends along a closed driving path comprising corresponding passive sections extending away from the transport path at the disengagement processing stations wherein the transport elements disengage from the driving system and a plurality of active sections corresponding to the transport path elsewhere wherein the transport elements engage with the driving system, wherein the driving system comprises corresponding pegs for the transport elements distributed uniformly along the driving system being integral therewith, wherein the transport elements have corresponding slits each for receiving the corresponding peg, wherein the driving system is configured to move each of the pegs in the active sections transversally to the corresponding slit thereby acting on the corresponding transport elements and in the passive sections longitudinally along and/or outside the corresponding slit thereby not acting on the corresponding transport elements, wherein the transport path is curved away from the processing stations between at least one pair of common points wherein the transport path and the driving path coincide, between the pair of common points the driving path comprising an internal portion of one of the active sections extending inside a corresponding external portion of the transport path wherein each of the pegs slides along the corresponding slit thereby causing the corresponding transport element to move faster than the driving system.

11. The bookbinding machine according to claim 10, wherein the processing stations comprise one or more movement processing stations for processing the book blocks while moving thereacross, the movement processing stations being arranged along the active sections at corresponding straight portions of the transport path.

12. The bookbinding machine according to claim 11, wherein at least one of the active sections at the movement processing stations comprises an oblique portion of the driving path extending obliquely to the corresponding straight portion of the transport path wherein each of the pegs moves obliquely to the corresponding slit thereby causing the corresponding transport element to move slower than the driving system.

13. The bookbinding machine according to claim 1, wherein the processing stations are adapted to be driven individually.

14. The bookbinding machine according to claim 1, wherein the bookbinding machine is a perfect-binding machine.

15. The bookbinding machine according to claim 14, wherein the engagement processing station is a cover application station for applying corresponding covers to the book blocks.

16. The bookbinding machine according to claim 15 wherein the engagement processing station is a cover application station for applying corresponding covers to the book blocks and wherein the sensor is for measuring the displacement between the book block of each of the transport elements at the cover application station and the corresponding cover.

17. A bookbinding plant comprising one or more bookbinding machines according to claim 1.

18. A method for operating a bookbinding machine, wherein the method comprises:

- processing book blocks in a plurality of processing stations, the processing stations comprising a plurality of stationary processing stations wherein the book blocks are processed while stationary therein, the stationary processing stations comprising at least one engagement processing station and one or more disengagement processing stations,
- transporting the book blocks individually by a plurality of transport elements,
- driving the transport elements in succession across the processing stations selectively by a driving system, each of the transport elements being driven by the driving system when engaged therewith and remaining stationary when disengaged therefrom,
- stopping the driving system repeatedly for corresponding stop periods by control means, in each of the stop periods:
  - corresponding at least one of the transport elements being at the engagement processing station engaged with the driving system, and
  - corresponding one or more of the transport elements being at the disengagement processing stations disengaged from the driving system.

19. A computer program configured for causing a control unit of a bookbinding machine to perform the method according to claim 18 when the computer program is executed on the control unit.

20. A computer program product comprising a computer readable storage medium embodying a computer program, the computer program being loadable into a working memory of a control unit of a bookbinding machine thereby configuring the control unit to perform the method according to claim 18.

* * * * *